(12) United States Patent
Arnold et al.

(10) Patent No.: US 8,561,462 B2
(45) Date of Patent: Oct. 22, 2013

(54) STORAGE TANK ASSEMBLY AND SYSTEM FOR STORING WASTE COOKING OIL

(75) Inventors: Gary Steven Arnold, Smithfield, NC (US); Stephen Butts, Holly Springs, NC (US)

(73) Assignee: Envicor, LLC, Smithfield, NC (US)

( * ) Notice: Subject to any disclaimer, the term of this patent is extended or adjusted under 35 U.S.C. 154(b) by 0 days.

(21) Appl. No.: 13/439,244

(22) Filed: Apr. 4, 2012

(65) Prior Publication Data

US 2012/0192646 A1 Aug. 2, 2012

Related U.S. Application Data

(63) Continuation of application No. 13/009,919, filed on Jan. 20, 2011, now abandoned.

(60) Provisional application No. 61/296,733, filed on Jan. 20, 2010, provisional application No. 61/321,485, filed on Apr. 6, 2010, provisional application No. 61/366,197, filed on Jul. 21, 2010.

(51) Int. Cl.
*G01F 23/18* (2006.01)

(52) U.S. Cl.
USPC .......................................................... 73/301

(58) Field of Classification Search
USPC .................................................. 73/299, 301
See application file for complete search history.

(56) References Cited

U.S. PATENT DOCUMENTS

| | | | |
|---|---|---|---|
| 4,591,434 A | 5/1986 | Prudhomme | |
| 4,899,649 A | 2/1990 | Grob et al. | |
| 4,936,148 A | 6/1990 | Shaw et al. | |
| 5,065,819 A | 11/1991 | Kasevich | |
| 5,228,985 A | 7/1993 | Wells et al. | |
| 5,249,511 A | 10/1993 | Shumate et al. | |
| 5,340,471 A | 8/1994 | Wilson et al. | |
| 5,609,193 A | 3/1997 | Steckler | |
| 5,717,817 A | 2/1998 | Brooks et al. | |
| 5,812,060 A | 9/1998 | DeSpain et al. | |
| 5,823,097 A | 10/1998 | Dirck | |
| 5,850,503 A | 12/1998 | Onken | |
| 5,908,551 A | 6/1999 | Onken | |
| 5,964,258 A | 10/1999 | Schoenbauer | |
| 5,968,396 A | 10/1999 | Rodriguez | |
| 6,077,356 A * | 6/2000 | Bouchard | 118/715 |
| 6,157,776 A | 12/2000 | Onken | |
| 6,227,405 B1 | 5/2001 | Andreoli et al. | |

(Continued)

OTHER PUBLICATIONS

Arnold et al., U.S. Appl. No. 13/009,912, filed Jan. 20, 2011.

(Continued)

*Primary Examiner* — Hezron E Williams
*Assistant Examiner* — Paul West
(74) *Attorney, Agent, or Firm* — Olive Law Group, PLLC (57) ABSTRACT

A storage tank and method for monitoring thereof is provided. The tank includes a first panel that defines a mounting surface for carrying a heating element. The heating element extends into the tank for heating liquids stowed therein. A sidewall interconnects the first panel and a spaced-apart second panel. A support extends from a bottom-facing surface of the second panel for supporting the tank in a spaced-apart relation from a nearby surface. The support further defines an upward-facing pocket for receiving a portion of the heating element. A control system may monitor the storage tank and alert a service provider of operative conditions thereof.

20 Claims, 10 Drawing Sheets

(56) References Cited

U.S. PATENT DOCUMENTS

| | | |
|---|---|---|
| 6,365,046 B1 | 4/2002 | Burke |
| 6,629,457 B1 * | 10/2003 | Keller ........................ 73/290 V |
| 6,792,983 B2 | 9/2004 | Allora |
| 6,981,531 B1 | 1/2006 | Palazzo |
| 6,996,336 B1 | 2/2006 | Mahoney et al. |
| 7,441,569 B2 | 10/2008 | Lease |
| 7,634,944 B2 * | 12/2009 | Hewitt ........................ 73/290 R |
| 2007/0227597 A1 | 10/2007 | Palazzo |
| 2008/0196596 A1 | 8/2008 | Forrest |
| 2011/0000295 A1 * | 1/2011 | Kritlow ........................ 73/299 |
| 2011/0009984 A1 * | 1/2011 | Mukhi et al. ................ 700/83 |

OTHER PUBLICATIONS

Frontline International M3 publication, accessible at http://www.perishablenews.com/index.php?article=0019066.

U.S. Non-Final Office Action dated Jan. 16, 2013 for related U.S. Appl. No. 13/009,919, filed Jan. 20, 2011.

* cited by examiner

# STORAGE TANK ASSEMBLY AND SYSTEM FOR STORING WASTE COOKING OIL

PRIORITY CLAIM

This application claims priority to U.S. Provisional patent application Ser. No. 13/009,919 filed on Jan. 20, 2011, which claims priority to U.S. Provisional Patent Application No. 61/296,733 filed on Jan. 20, 2010, U.S. Provisional Patent Application No. 61/321,485 filed on Apr. 6, 2010, and U.S. Provisional Patent Application No. 61/366,197 filed on Jul. 21, 2010, the entire contents of all of which are hereby incorporated by reference herein.

TECHNICAL FIELD

The presently disclosed subject matter is generally directed towards a storage tank assembly that is used at food handling facilities, such as restaurants for the storage of cooking grease. More particularly, the storage tank assembly of this presently disclosed subject matter is directed towards a translucent plastic tank having a heater to maintain the fluidity of the stored cooking grease and a control system for monitoring the storage tank assembly.

BACKGROUND

Most restaurants use bulk quantities of cooking oil for frying food and require a method or apparatus for bulk storage of both fresh and spent (used or waste) oil. Waste cooking oil can be recycled for use in cattle feed, bio-fuels, soap and other products. There are a multitude of recyclers willing to collect waste cooking oil from restaurants on a routine basis. In some instances, restaurants would deposit their waste cooking oil in drums that were typically stored outside where they were picked up when full.

Many attempts have been made to transport waste oil from cooking fryers to metal holding containers that made it easier for recyclers to collect the waste oil. These attempts have various disadvantages associated therewith, as handling and storing of waste cooking oil at restaurants is labor intensive, hazardous, and wasteful. Restaurant personnel were subject to hot oil burns, slipping on greasy floors, or injury due to lifting and pouring waste oil into a holding tank. Additionally, conventional tank storage systems may have been bulky or heavy.

Service providers that collect waste cooking oil from restaurants for recycling have an incentive to provide improved equipment for the handling and storage of waste cooking oil. Un-warmed waste oil must be heated to make it sufficiently fluid to be poured or pumped out of the holding container into a tanker truck for removal. Waste oil that is temporarily stored outside the restaurant can attract animals, become contaminated, and cause a slick hazardous walking surface.

Today there are service providers that provide their restaurant customers improved equipment that make it safer, less labor intensive and cleaner to transfer the waste oil from the fryers to the oil holding tank for periodic collection. These tank storage systems are sufficiently translucent so that the oil level can be viewed from outside the tank so that when the oil level reaches a predetermined level, the service provider may be contacted for collection. These systems may also include a liquid level sensor or switch that can signal a high level or overflow condition to make restaurant personnel aware that the service provider should be contacted immediately. The use of a high level alarm is particularly useful for automatic storage tank systems that include a pump to transfer heated waste cooking oil directly from the fryers or cookers to the holding tank. Automatic storage tank systems are convenient for restaurants but can cause problems due to unexpected equipment failure such as failed pumps, automatic valves, heaters, and stuck or clogged liquid level sensors or switches.

Accordingly, there is a need for a storage tank assembly and control system that addresses the various issues presented with conventional storage tank assemblies.

SUMMARY

According to one aspect, a storage tank is provided. The storage tank includes a first panel defining a mounting surface for carrying a heating element that extends into the tank for heating liquids stowed therein and a sidewall interconnecting the first panel and a spaced-apart second panel. A support extends from a bottom-facing surface of the second panel for supporting the second panel in a spaced-apart relation from a support surface. The support also defines an upward-facing pocket for receiving a portion of the heating element.

According to another aspect, the tank includes a platform extending from the first panel for mounting the heating element.

According to another aspect, the tank includes a rim extending around a periphery of the first panel.

According to another aspect, the tank includes a plurality of supports extending from the bottom-facing surface of the second panel, the supports configured for spacing the second panel from the support surface.

According to another aspect, the first panel and the second panel generally define a disk shape.

According to another aspect, the sidewall defines a taper between the first panel and the second panel.

According to one aspect, a storage tank assembly is provided. The storage tank assembly includes a tank having a first panel and a spaced-apart second panel that is interconnected therewith by a sidewall, and a heating element extending into the tank for heating liquids stowed therein. The second panel defines a support extending from a bottom-facing surface thereof that further defines an upwardly-facing pocket that receives a portion of the heating element.

According to another aspect, the tank assembly includes a platform extending from the first panel for mounting one of the heating element or outlet pipe.

According to another aspect, the tank assembly includes a pump for pumping liquids, an outlet pipe for communicating with an external tank, a liquid level gage for gaging the level of liquid in the tank, and a vent for venting liquids in the tank.

According to another aspect, the tank assembly includes a control panel in communication with the liquid level gage for communicating with a control system.

According to another aspect, the tank assembly includes a platform extending from the first panel for mounting at least one of the pump, outlet pipe, liquid level gage, or vent.

According to another aspect, the tank assembly includes a rim extending around a periphery of the first panel.

According to another aspect, the tank assembly includes a plurality of supports extending from the bottom-facing surface of the second panel, the supports configured for spacing the second panel from a support surface.

According to another aspect, the first panel and the second panel generally define a disk shape.

According to another aspect, the sidewall defines a taper between the first panel and the second panel.

According to one aspect, a method is provided. The method includes determining a liquid level in a storage tank, associating an operative condition based on the liquid level, and sending a signal corresponding to the operative condition.

According to another aspect, determining a liquid level comprises determining a liquid level using a pressure transducer carried by the tank.

According to another aspect, associating an operative condition based on the liquid level comprises associating an at capacity operative condition when the liquid level is full.

According to another aspect, associating an operative condition based on the liquid level comprises associating a less than capacity operative condition when the liquid level is less than full.

According to another aspect, associating an operative condition based on the liquid level comprises associating an overflow operative condition when the liquid level is greater than full.

According to another aspect, sending a signal corresponding to the operative condition comprises sending a wireless signal.

According to another aspect, sending a signal corresponding to the operative condition comprises sending a Short Message Service (SMS).

According to another aspect, sending a signal corresponding to the operative condition comprises sending a signal to a service provider.

According to one aspect, a system is provided. The system includes a storage tank, a liquid level gage in operative communication with the tank, and a control panel in communication with the liquid level gage and configured to associate an operative condition based on the liquid level and send a signal corresponding to the operative condition.

According to another aspect, the liquid level gage is a pressure transducer.

According to another aspect, the control panel is configured to associate an at capacity operative condition when the liquid level is full.

According to another aspect, the control panel is configured to associate a less than capacity operative condition when the liquid level is less than full.

According to another aspect, the control panel is configured to associate an overflow operative condition when the liquid level is greater than full.

According to another aspect, the control panel is configured to associate an operative condition based on the liquid level at a first time and the liquid level at a second time.

According to another aspect, the control panel is configured to send a wireless signal.

According to another aspect, the control panel is configured to send a Short Message Service (SMS).

According to another aspect, the control panel is configured to send a signal corresponding to the operative condition to a service provider.

According to one aspect, a system is provided. The system includes a waste oil storage tank, at least one sensor in operative communication with the storage tank, and a control panel in communication with the at least one sensor and configured to associate an operative condition based on a response received from the at least one sensor, and further configured to send a signal corresponding to the operative condition to a service provider.

According to another aspect, the sensor is a liquid level sensor, and the control panel is configured to associate an at capacity operative condition when the liquid level is full, a less than capacity operative condition when the liquid level is less than full, and an overflow operative condition when the liquid level is greater than full.

According to another aspect, the sensor is a temperature sensor in communication with a pump that is in fluid communication with the tank, and the control panel is configured to associate an overheated operative condition when the temperature is above a predetermined temperature.

According to another aspect, the sensor is a failure sensor in communication with a heating element carried by the tank and configured for detecting a failure of the heating element, and the control panel is configured to associate a heating element failure operative condition when a heating element failure is detected.

According to another aspect, the sensor is a sensor in communication with a vent pipe in fluid communication with the tank and configured for detecting filling or evacuation of the tank, and the control panel is configured to associate a filling operative condition when filling of the tank is detected and an evacuation operative condition when evacuation of the tank is detected.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION OF THE PREFERRED EMBODIMENTS

The presently disclosed subject matter now will be described more fully hereinafter with reference to the accompanying drawings, in which some, but not all embodiments are shown. Indeed, presently disclosed subject matter may be embodied in many different forms and should not be construed as limited to the embodiments set forth herein; rather, these embodiments are provided so that this disclosure will satisfy applicable legal requirements. Like numbers refer to like elements throughout.

Figure 1:
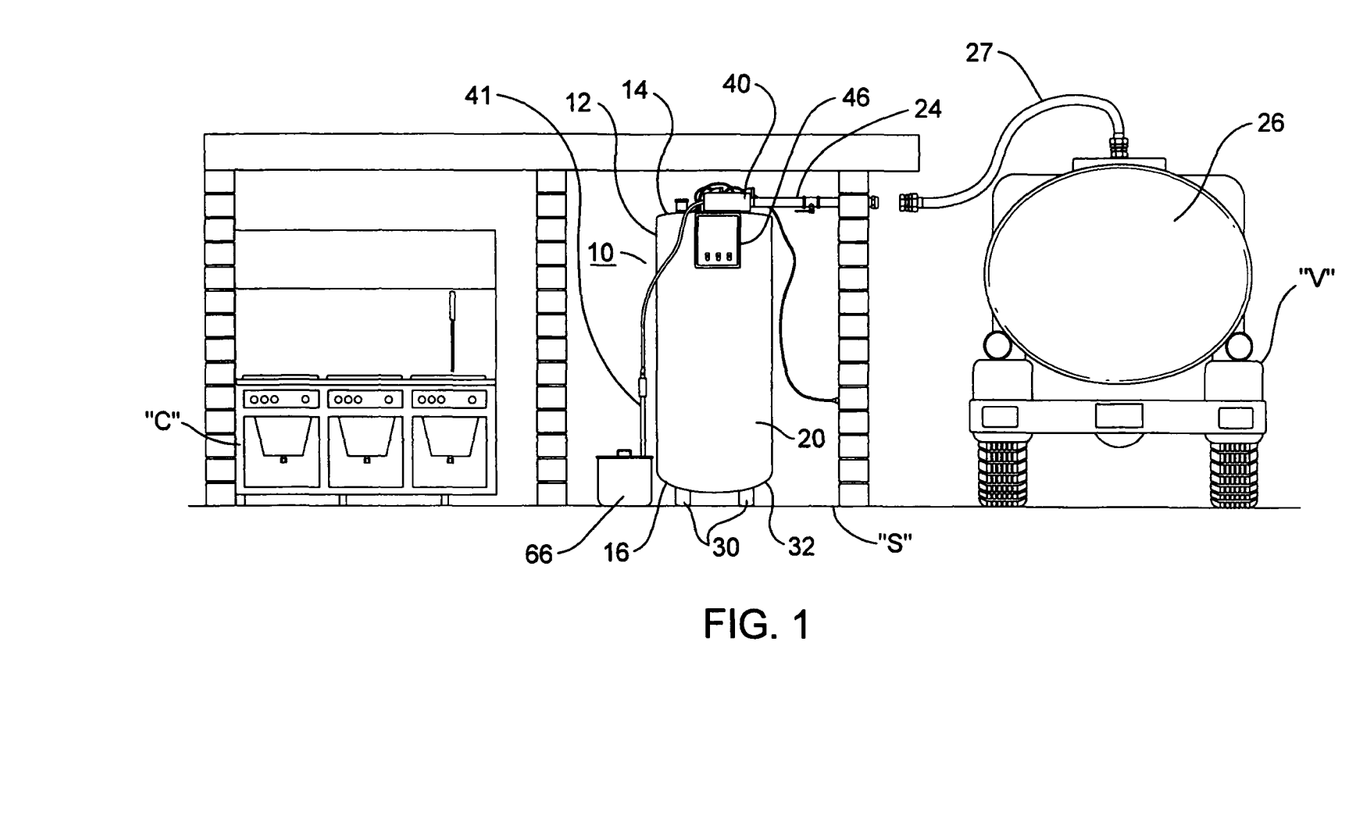
FIG. 1 illustrates a storage tank assembly proximal oil cookers according to one or more embodiments of the disclosed subject matter.

A storage tank assembly is illustrated in FIG. 1 and is generally designated 10. As illustrated, storage tank assembly 10 may be positioned within a structure that additionally includes cookers "C" or other restaurant equipment that may have waste liquids as a by-product.

The storage tank assembly 10 includes a tank 12 that is defined by a first panel 14 and a spaced-apart second panel 16. A sidewall 20 interconnects each of the first panel 14 and the second panel 16. At least one support 30 may extend from a bottom facing surface 32 of the second panel 16 and is provided for maintaining the bottom facing surface 32 of the tank 12 a predetermined distance away from a nearby support surface "S". A pump 40 may be provided on the first panel 14 for pumping fluids through, for example, a line 41 that extends from a waste container 66 that may contain waste fluids. The waste fluids may be, for example, waste cooking oil from cookers "C", while in other embodiments may be any by-product liquid that may be encountered in a commercial, industrial, or residential facility such as, but not limited to, used motor oils or water saturated with harmful chemicals. In other embodiments, the cookers "C" may be connected to the tank assembly 10 by a line extending from each cooker "C".

The pump 40 is configured such that it can transfer heated liquids into the oil storage tank 12 without failure. The pump 40 may have a thermal switch that prevents the pump from operating when the oil temperature exceeds a pre-set maximum operating temperature. The pump 40 may also have a time limit switch that will not allow the pump 40 to be operated for more than a predetermined period of time.

The tank 12 may be made of any suitable material, and in one or more embodiments, may be made of translucent polyethylene to eliminate corrosion and to further provide a translucent property so that the liquid level may be observed from outside of the tank 12. The tank 12 may also be rotationally molded, and may included graphics or other liquid level indicating indicia on an outside surface thereof.

An outlet pipe 24 may be provided in communication with the tank assembly 10 for communicating with an external storage tank 26 through line 27. The outlet pipe 24 may include an in-line valve that provides a level of security against unauthorized pumping of the tank 12. Storage tank 26 may be carried by a vehicle 26 for transport, or may be an external storage tank that is in communication with, for example, a refinery that can process the liquid waste by-product contained therein.

The storage tank assembly 10 and storage tank 12 are further described with reference to FIGS. 2A through 5. As depicted, the storage tank assembly 10 includes a tank 12 that is defined by the first panel 14, second panel 16, and interconnecting sidewall 20. A control panel 46 is mounted to the sidewall 20. The control panel 46 may be in communication with a heating element 22, pump 40, and liquid level gage 42. As used herein, gage and sensor may be interchangeably used and are representative of any device or apparatus that can detect a characteristic to be measured. The heating element 22 may be provided for heating the liquid contained within the tank 12 to a sufficiently warm temperature so as to reduce viscosity of the liquid for ease of removal, pouring, and pumping. For example, if the liquid is oil, then the heating element 22 may heat the oil to approximately 115 to 130 degrees Fahrenheit to keep the fluids at a sufficiently low viscosity.

Figure 3A:
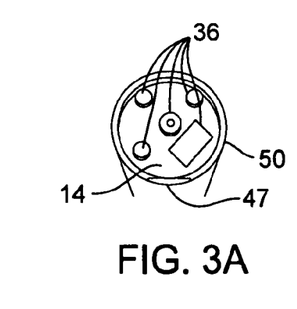
FIG. 3A is a top facing perspective view of a storage tank according to one or more embodiments of the disclosed subject matter.
Figure 3B:
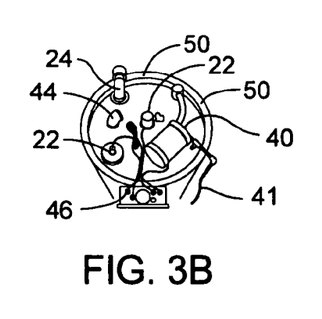
FIG. 3B is a top facing perspective view of a storage tank assembly according to one or more embodiments of the disclosed subject matter.

The first panel 14 and sidewall 20 of the storage tank 12 are depicted in FIGS. 3A and 3B. As depicted in FIG. 3A, the sidewall 20 defines a recess 47 that receives the control panel 46. A rim 50 may be provided along a periphery of the first panel 14. A plurality of platforms 36 or risers extend from the first panel 14. The platforms 36 provide a mounting surface for each of the heating element 22, pump 40, liquid level gage 42, vent 44, and inlet pipe 45. Vent 44 may be provided for discharging air in the tank 12 when the tank 12 is being filled, while also drawing in air when the tank 12 is being evacuated. The vent 44 may be provided in fluid communication within a facility such as a restaurant, or may be vented to an outside environment. The vent 44 may also be provided with a sensor or gage that monitors fluid flow therethrough and is configured for providing indication of the tank 12 either being filled or evacuated.

The pump 40 may be secured to the platform 36 by threaded fasteners such as machine screws or bolts, or may be secured by any other appropriate manner. The heating element 22 may be secured by being threadably engaged in a correspondingly threaded recess formed in either the platform 36 or panel 14. Similarly, the liquid level gage 42, vent 44, and inlet pipe 45 may be threadably engaged in a corresponding threaded recess formed in either the platform 36 or panel 14. In one or more embodiments, any suitable manner of securing each of the heating element 22, liquid level gage 42, vent 44, and inlet pipe 45 to either the platform 36 or panel 14 may be utilized.

Each of the pump heating element 22, pump 40, and liquid level gage 42 may be in communication with the control panel 46. The control panel 46 is configured for controlling various functions of each of the heating element 22 and pump 40 to provide notification to an operator or service provider according to a system and method disclosed and described with relation to FIG. 8.

Figure 4A:
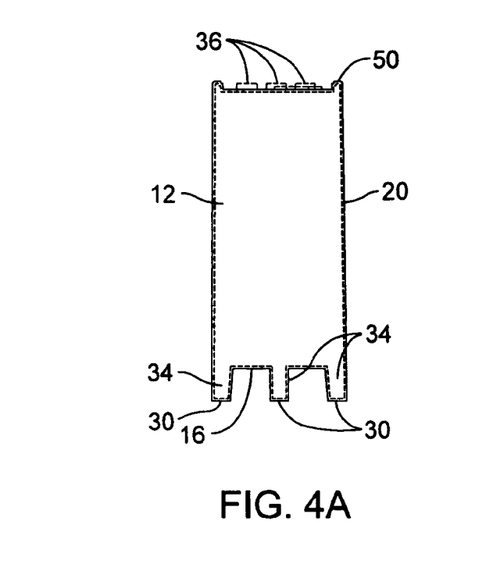
FIG. 4A is a cross-sectional side view of a storage tank according to one or more embodiments of the disclosed subject matter.
Figure 4B:
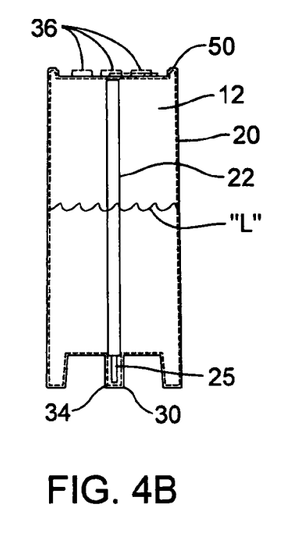
FIG. 4B is a cross-sectional side view of a storage tank having a heating element and liquid stowed therein according to one or more embodiments of the disclosed subject matter.
Figure 5:
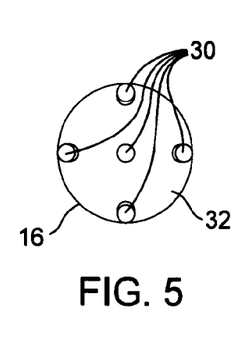
FIG. 5 is a bottom facing perspective view of a storage tank assembly according to one or more embodiments of the disclosed subject matter.

A cross-sectional view of the tank 12 is depicted in FIGS. 4A and 4B. FIG. 4A depicts the tank 12 without any hardware installed thereon. As depicted, the supports 30 form "feet" for maintaining the tank 12 in spaced-apart arrangement from a nearby ground surface. The supports 30 are in structural and fluid communication with the tank 12 and further define upwardly-facing pockets 34 within the tank 12. In one or more embodiments, such as those depicted in FIG. 4B, these pockets 34 are configured for receiving and nesting with, for example, the heating element 22. In this manner, the heating element 22 is supported on a bottom portion thereof within the pocket 34 that is formed in support 30. This represents an advantage over systems that are supported at only a top portion. In those systems, bulky hardware must be utilized at the top portion of the tank, adding unwanted weight and cost. Additionally, reinforcements may be required at the top portion of the tank, and the reinforcements and increased weight may require the use of metal or thick plastic materials for constructing the tank 12. Additionally, in one or more embodiments, the outlet pipe 24, or any other hardware extending from within the tank at a top portion thereof to a bottom portion thereof, may also be partially received within pocket 34 defined in one of the supports 30.

A liquid level "L" is also depicted in FIG. 4B. The liquid level "L" will vary depending on the amount of liquid in the tank 12. The liquid level gage 42 is in communication with the tank 12 for determining the liquid level "L" at any given time. The liquid level gage 42 may be any suitable liquid gage, including a float type, pressure or pneumatic type, or one utilizing ultrasonic measuring. The liquid level gage 42 may be positioned in the first panel 14, or in other embodiments, may be positioned at varying vertical positions within the tank 12. In one or more embodiments, an ultrasonic liquid level gage may be utilized that has a relay controller in order to eliminate designs with multiple gages. Each gage may also measure the liquid level at a first and a second time period, and compare the measurements at the first and second times to determine an operative condition of the tank assembly 10.

Figure 6A:
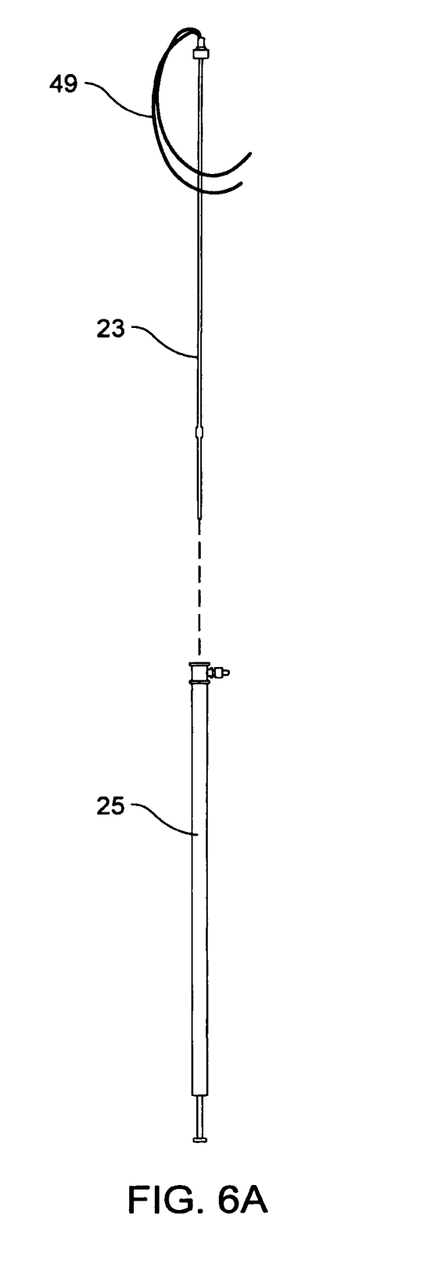
FIG. 6A is an exploded view of a heating element for use with a storage tank assembly according to one or more embodiments of the disclosed subject matter.
Figure 6B:
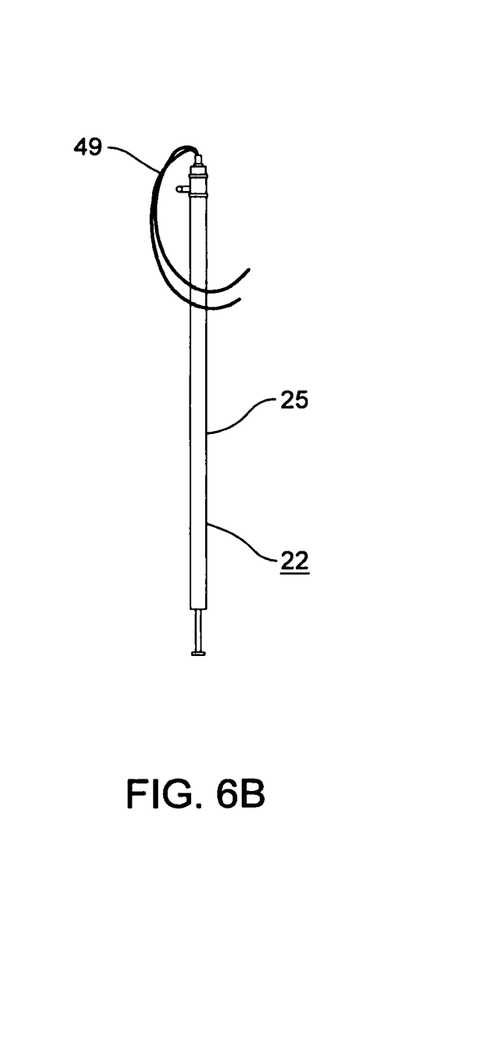
FIG. 6B is a front view of a heating element for use with a storage tank assembly according to one or more embodiments of the disclosed subject matter.

FIG. 6A depicts an exploded front view of one or more embodiments of the heating element 22. As depicted, the heating element 22 includes a resistive element 23 that is configured for being received within a casing 25. Casing 25 acts to provide a greater surface area for heating of liquids contained in the tank 12, as well as protect the resistive element 23 from liquids and contamination. The heating element 22 may be secured into the casing 25 by fasteners, a press fit, adhesive, or any other suitable manner. As depicted in FIG. 6B, the resistive element 23 includes communication wires 49 for being in communication with the control panel 46. The heating element 22 is sized to provide an optimum temperature to keep the liquid at a sufficiently low viscosity.

Figure 7A:
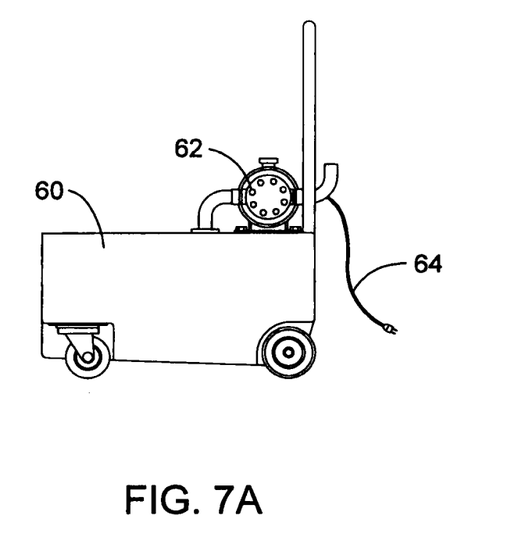
FIG. 7A is side view of a cart for use in transporting waste oil for stowage in a storage tank assembly according to one or more embodiments of the disclosed subject matter.
Figure 7B:
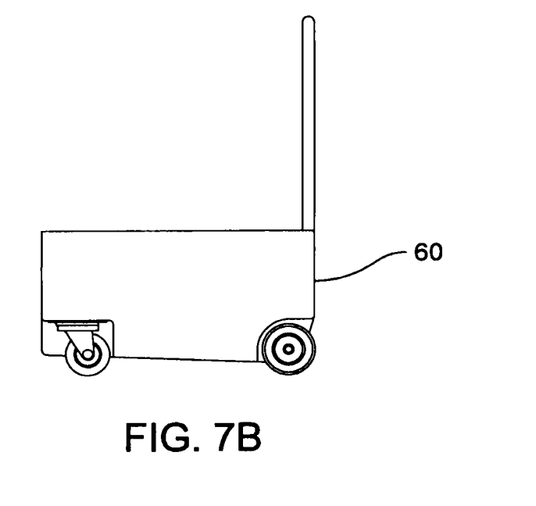
FIG. 7B is a side view of a cart for use in transporting waste oil for stowage in a storage tank assembly according to one or more embodiments of the disclosed subject matter.

FIG. 7A depicts a cart 60 for transporting waste fluids, such as cooking oil, from a waste site, such as cookers "C" depicted in FIG. 1. The cart 60 may include a pump 62 that is powered by electricity received through cord 64. In one or more embodiments such as those depicted in FIG. 7B, the cart 60 may not include a pump and may instead receive pumping forces from external sources such as pump 40 of the tank assembly 10. In this manner, hose 41 that is connected with pump 40 as depicted in FIG. 2B would be inserted into the cart 60 and waste fluids would then be pumped into the tank 12.

Figure 2A:
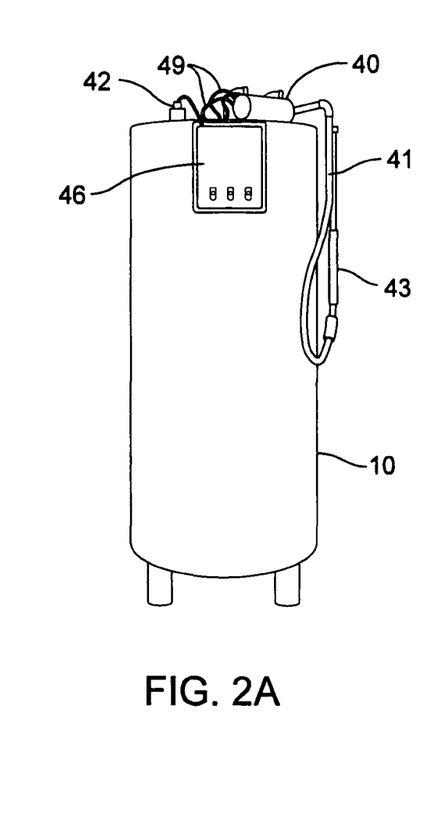
FIG. 2A is a front view of a storage tank assembly according to one or more embodiments of the disclosed subject matter.
Figure 2B:
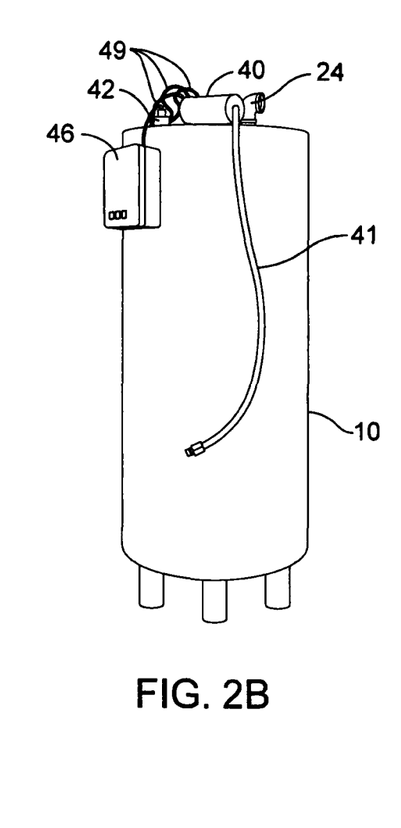
FIG. 2B is a side view of a storage tank assembly according to one or more embodiments of the disclosed subject matter.

The hose 41 may be connected to a suction wand assembly 43, as depicted in FIG. 2B, for drawing or sucking the liquid out of a container, such as container 66 depicted in FIG. 1, while in one or more embodiments, the wand assembly 43 may be directly connected with or configured for directly connecting with cookers "C". In one or more embodiments of the disclosed subject matter, the hose 41 or wand assembly 43 may include a temperature control unit in communication therewith that monitors incoming liquid temperature so that the pump 40 will not pump liquid that is above a predetermined temperature. In one or more embodiments, the predetermined temperature may be 160 degrees Fahrenheit. A filter may also be provided in communication with the wand assembly 43 for filtering particles in the liquid.

Figure 8:
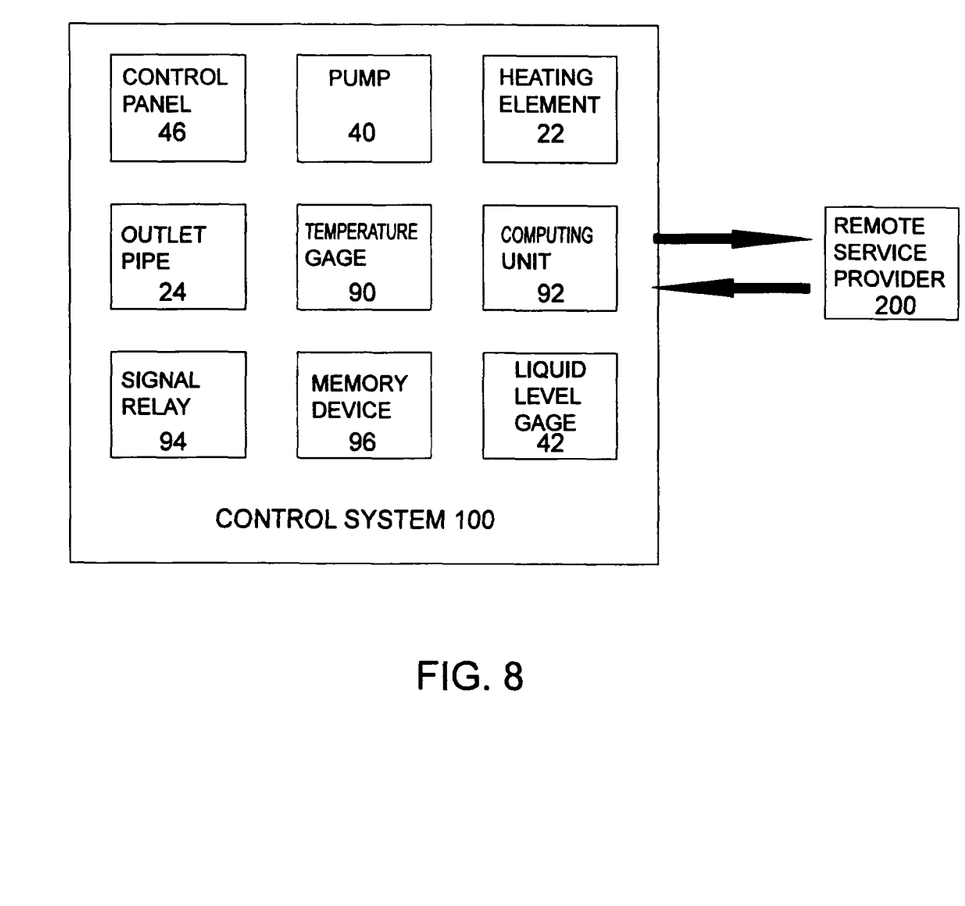
FIG. 8 is a schematic view of a control system according to one or more embodiments of the disclosed subject matter.

A control system 100 is depicted in FIG. 8 for use with tank assembly 10 according to one or more embodiments of the disclosed subject matter. The control system 100 is in communication with the heating element 22, outlet pipe 24, pump 40, liquid level gage 42, and control panel 46. Additionally, the control system 100 may be in communication with a temperature gage 90 for determining the temperature of waste fluids in the tank 12 or for determining the temperature of fluids entering the pump 40. The control system 100 may also be in communication with a computing unit 92 that determines, for example, the liquid level "L" in the tank 12 according to a signal received from the liquid level gage 42. Additionally, a signal relayer 94 may be provided in communication with the control system 100 for relaying signals from the computing unit to a remote service provider 200. The control system 100 may also be in communication with a memory device 96 for storing information from the computing unit 92. The memory device 96 may be any device capable of storing analog or digital information thereon. The signal relayer 94 may relay information to the service provider 200 by land telephone line, cellular transmission, internet, or any other suitable communication medium. In one or more embodiments, short message services (SMS) or multimedia message services (MMS) may be utilized. The information transmitted may be, for example, notification that tank 12 is full or close to full, or that the tank 12 is in an overflow condition. Additionally, a timer switch may be in communication with the pump 40 that will automatically power off the pump after being operational for a predetermined period of time, which in one or more embodiments, may be a three to five minute interval. A pressure switch such as a diaphragm valve may be in communication with the vent 44 that is operable to detect an overflow and, in response thereto, the control system 100 may power off the pump 40, while in other embodiments, the pressure switch may be operable to detect that the tank 12 is being filled or evacuated. In one or more embodiments, the control system 100 may be further configured to detect failure of any of the devices in communication therewith, including a failed pump 40 or failed heater element 22.

Figure 9:
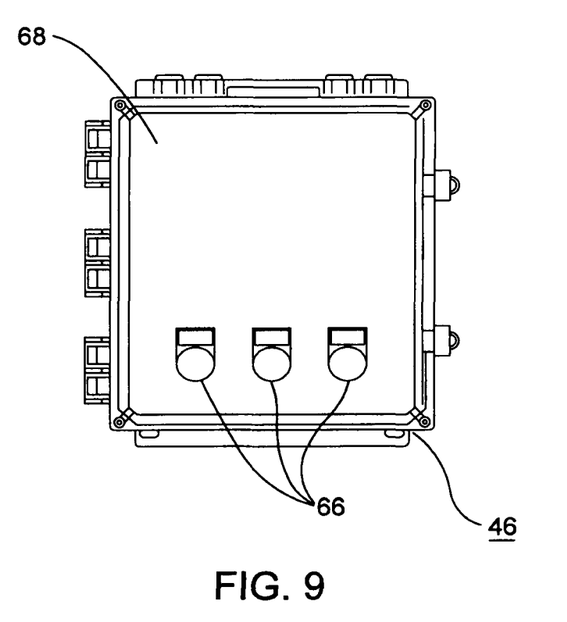
FIG. 9 is a front view of a control panel according to one or more embodiments of the disclosed subject matter.

A front view of the control panel 46 is depicted in FIG. 9. The control panel 46 may include a plurality of switches 66 on a front panel 68 thereof. The switches may be illuminatable to represent various operative conditions.

Figure 10:
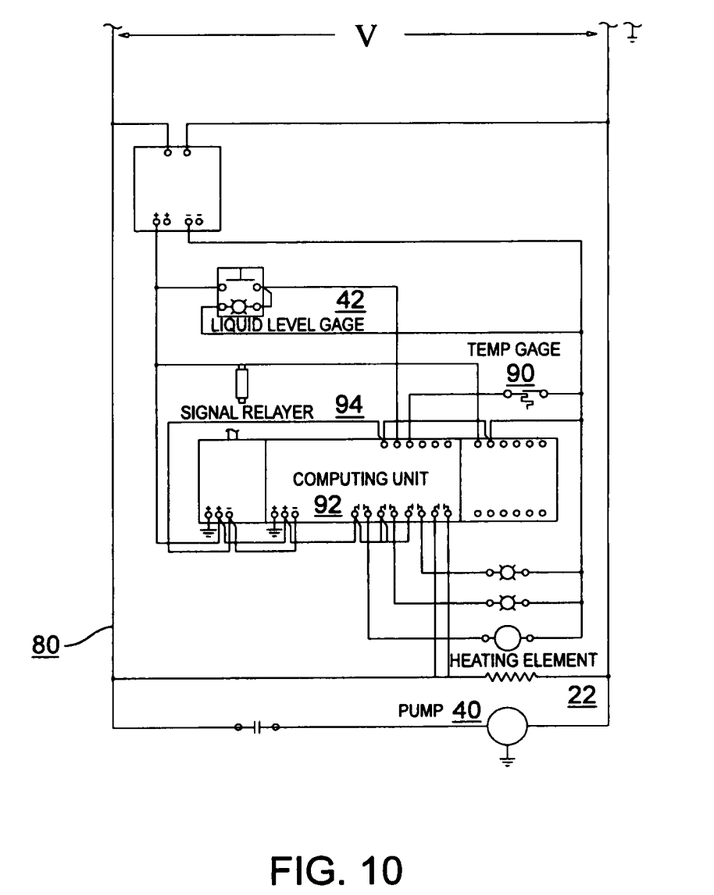
FIG. 10 is a wiring diagram for use with a control panel according to one or more embodiments of the disclosed subject matter.

FIG. 10 depicts an electrical wiring diagram that may be used in conjunction with the control system 100. The arrangement of the heating element 22, pump 40, liquid level gage 42, temperature gage 90, computing unit 92, and signal relayer 94 may be depicted according to the wiring diagram of FIG. 10.

Figure 11:
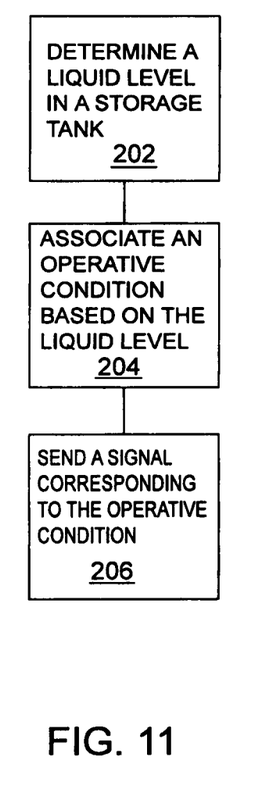
FIG. 11 is a flow chart depicting a method according to one or more embodiments of the disclosed subject matter.
Figure 12:
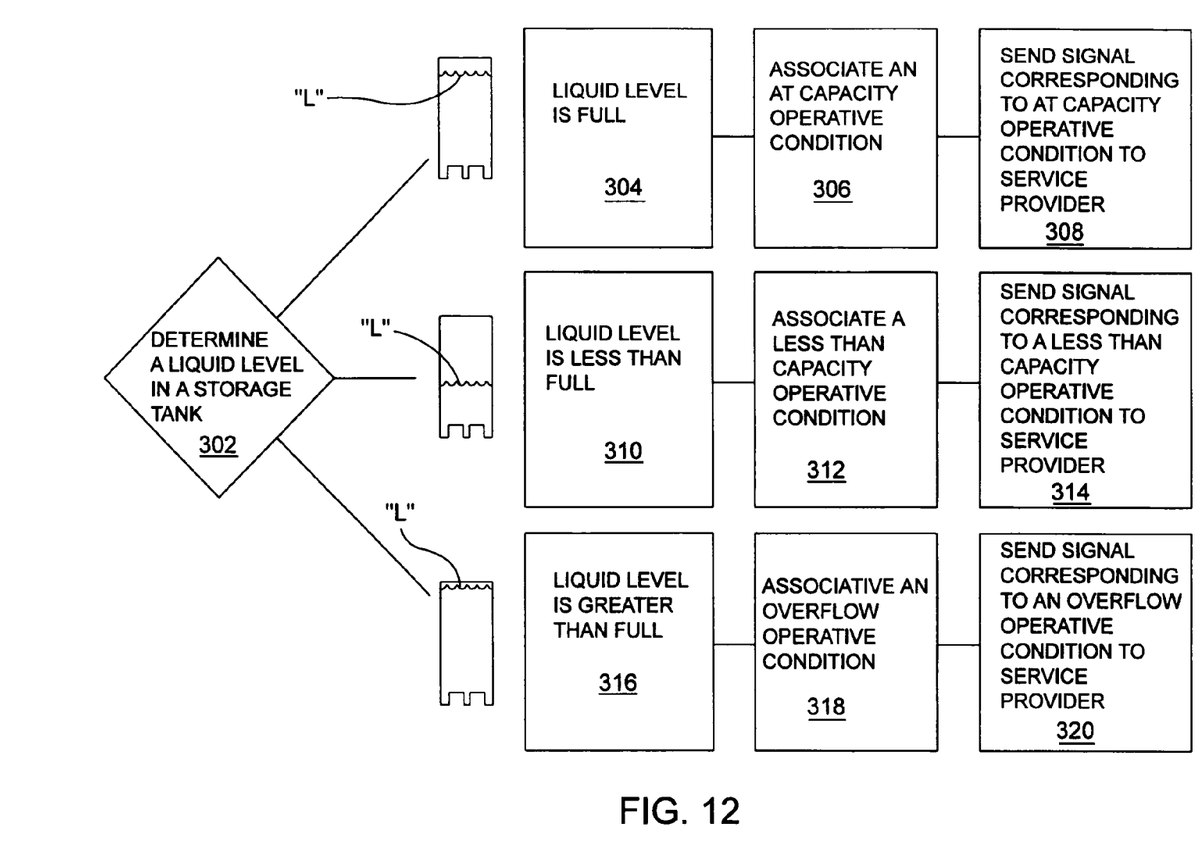
FIG. 12 is a flow chart depicting a method according to one or more embodiments of the disclosed subject matter.

The control system 100 may be configured to monitor the tank assembly 10 in a manner generally depicted as a flow chart in FIG. 11 in which a method 200 is provided. The method 200 may include determining a liquid level in a storage tank 202, associating an operative condition based on the liquid level 204, and sending a signal corresponding to the operative condition 206. As used herein, operative condition may mean any status, identifier, or similar that provides an indication as to the operative condition of the tank assembly 10.

FIG. 11 depicts illustrative examples of operative conditions. A cross-sectional view consistent with FIG. 4A representing various respective operative conditions according to method 300 is provided. The method 300 may include determining a liquid level in a storage tank 302. If the liquid level "L" is at a predetermined "full" position, then the liquid level is full 304. The method 300 associates an at capacity operative condition 306 and sends a signal corresponding to an at capacity operative to a service provider 308. If the liquid level "L" is below a predetermined "full" position, then the liquid level is less than full 310. The method 300 associates a less than capacity operative condition 312 and sends a signal corresponding to at capacity operative to a service provider 314. If the liquid level "L" is above a predetermined "full" position, then the liquid level is greater than full 316. The method 300 associates an overflow operative condition 318 and sends a signal corresponding to at capacity operative to a service provider 320. The overflow operative condition may also be determined by, for example, monitoring fluid flowthrough in the vent 44.

The various techniques described herein may be implemented with hardware or software or, where appropriate, with a combination of both. These techniques may be embodied on a server or control system 100 of the presently disclosed subject matter. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
    a storage tank including an upper panel, a lower panel, and a sidewall connecting the upper panel and lower panel to define an interior, at least one support extending away from the interior from the lower panel, the support at least partially supporting the storage tank and defining a pocket facing into the interior and in fluid communication with the interior;
    an elongate operative hardware element extending between the upper panel and the lower panel, the operative hardware element having an upper end supported directly or indirectly by the upper panel, and a lower end supported directly or indirectly by the lower panel, the lower end received by the pocket; and
    a control panel in communication with the operative hardware element and configured to associate an operative condition based on the operative hardware element and send a signal corresponding to the operative condition, wherein the elongate operative hardware element comprises a heating element.

2. The system according to claim 1, further comprising a liquid level gage that measures a liquid level.

3. The system according to claim 2, wherein the control panel is configured to associate an at capacity operative condition when the liquid level is full.

4. The system according to claim 2, wherein the control panel is configured to associate a less than capacity operative condition when the liquid level is less than full.

5. The system according to claim 2, wherein the control panel is configured to associate an overflow operative condition when the liquid level is greater than full.

6. The system according to claim 2, wherein the control panel is configured to associate an operative condition based on the liquid level at a first time and the liquid level at a second time.

7. The system according to claim 1, wherein the control panel is configured to send a wireless signal.

8. The system according to claim 7, wherein the control panel is configured to send a Short Message Service (SMS).

9. The system according to claim 1, wherein the control panel is configured to send a signal corresponding to the operative condition to a service provider.

10. The system according to claim 1, wherein the storage tank comprises a vent for venting air during filling of the tank.

11. The system according to claim 1, wherein the heating element is within the tank to maintain the fluidity of cooking grease.

12. The system according to claim 1, further comprising a pump for pumping fluids into the tank, and
    wherein, when the control panel associates an overflow operative condition of the tank, the control panel is configured to turn off the pump.

13. A system comprising:
    a waste oil storage tank including an upper panel, a lower panel, and a sidewall connecting the upper panel and lower panel to define an interior, at least one support extending away from the interior from the lower panel, the support at least partially supporting the storage tank and defining a pocket facing into the interior and in fluid communication with the interior;
    an elongate operative hardware element extending between the upper panel and the lower panel, the operative hardware element having an upper end supported directly or indirectly by the upper panel, and a lower end supported directly or indirectly by the lower panel, the lower end received by the pocket;
    at least one sensor in operative communication with the storage tank; and
    a control panel in communication with the at least one sensor and configured to associate an operative condition based on a response received from the at least one sensor, and further configured to send a signal corresponding to the operative condition to a service provider,
    wherein the storage tank comprises multiple supports defining support feet that together support the storage tank, and wherein each support defines a pocket that faces into the interior and is in fluid communication with the interior such that the total volume capacity of the storage tank includes interior volumes of the pockets.

14. The system according to claim 13, wherein the sensor is a liquid level sensor, and the control panel is configured to associate an at capacity operative condition when the liquid level is full, a less than capacity operative condition when the liquid level is less than full, and an overflow operative condition when the liquid level is greater than full.

15. The system according to claim 13, further including a heater within the tank to maintain the fluidity of waste oil.

16. The system according to claim 13, wherein the elongate operative hardware element comprises a heating element.

17. The system according to claim 13, wherein the elongate operative hardware element comprises a liquid level gage.

18. The system according to claim 13, wherein the elongate operative hardware element comprises an outlet pipe.

19. A system comprising:
- a storage tank including an upper panel, a lower panel, and a sidewall connecting the upper panel and lower panel to define an interior, at least one support extending away from the interior from the lower panel, the support at least partially supporting the storage tank and defining a pocket facing into the interior and in fluid communication with the interior;
- an elongate operative hardware element extending between the upper panel and the lower panel, the operative hardware element having an upper end supported directly or indirectly by the upper panel, and a lower end supported directly or indirectly by the lower panel, the lower end received by the pocket; and
- a control panel in communication with the operative hardware element and configured to associate an operative condition based on the operative hardware element and send a signal corresponding to the operative condition,
- wherein the elongate operative hardware element comprises an outlet pipe.

20. A system comprising:
- a storage tank including an upper panel, a lower panel, and a sidewall connecting the upper panel and lower panel to define an interior, at least one support extending away from the interior from the lower panel, the support at least partially supporting the storage tank and defining a pocket facing into the interior and in fluid communication with the interior;
- an elongate operative hardware element extending between the upper panel and the lower panel, the operative hardware element having an upper end supported directly or indirectly by the upper panel, and a lower end supported directly or indirectly by the lower panel, the lower end received by the pocket; and
- a control panel in communication with the operative hardware element and configured to associate an operative condition based on the operative hardware element and send a signal corresponding to the operative condition,
- wherein the storage tank comprises multiple supports defining support feet that together support the storage tank, and wherein each support defines a pocket that faces into the interior and is in fluid communication with the interior such that the total volume capacity of the storage tank includes interior volumes of the pockets.

* * * * *